US011863481B2

(12) United States Patent
Jiang et al.

(10) Patent No.: US 11,863,481 B2
(45) Date of Patent: Jan. 2, 2024

(54) METHOD AND DEVICE IN UE AND BASE STATION FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 23 days.

(21) Appl. No.: 17/673,789

(22) Filed: Feb. 17, 2022

(65) Prior Publication Data

US 2022/0173861 A1    Jun. 2, 2022

Related U.S. Application Data

(63) Continuation of application No. 16/894,893, filed on Jun. 8, 2020, now Pat. No. 11,290,234, which is a
(Continued)

(51) Int. Cl.
*H04L 5/00*  (2006.01)
*H04B 7/06*  (2006.01)
(Continued)

(52) U.S. Cl.
CPC ......... *H04L 5/0048* (2013.01); *H04B 7/0617* (2013.01); *H04B 7/08* (2013.01);
(Continued)

(58) Field of Classification Search
CPC ....... H04B 7/0617; H04B 7/08; H04L 5/0023; H04L 5/0048; H04L 5/0055; H04W 16/28
See application file for complete search history.

(56) References Cited

U.S. PATENT DOCUMENTS 11,290,234 B2 *   3/2022   Jiang ................. H04B 7/08
2016/0007261 A1   1/2016   Oh
(Continued)

FOREIGN PATENT DOCUMENTS

CN    106358216 A    1/2017
CN    106900074 A    6/2017
(Continued)

OTHER PUBLICATIONS

ISR received in application No. PCT/CN2017/116893 dated Aug. 31, 2018.
(Continued)

*Primary Examiner* — David B Lugo

(57) ABSTRACT

The disclosure provides a method and a device in a User Equipment (UE) and a base station for wireless communication. The UE receives a target radio signal, transmits a first radio signal in a first time resource pool, and monitors a first signaling in a second time resource pool in a first frequency domain resource; a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling. By designing the first signaling, the disclosure achieves a more efficient beam management on unlicensed spectrum, thus improves the overall transmission efficiency and performance of system.

20 Claims, 14 Drawing Sheets

Related U.S. Application Data continuation of application No. PCT/CN2017/116893, filed on Dec. 18, 2017.

(51) Int. Cl.
*H04B 7/08* (2006.01)
*H04W 16/28* (2009.01)

(52) U.S. Cl.
CPC .......... *H04L 5/0023* (2013.01); *H04L 5/0055* (2013.01); *H04W 16/28* (2013.01)

(56) References Cited

U.S. PATENT DOCUMENTS

| | | | |
|---|---|---|---|
| 2016/0353467 A1* | 12/2016 | Nekovee | H04W 72/542 |
| 2018/0368142 A1* | 12/2018 | Liou | H04W 74/0808 |
| 2019/0059106 A1* | 2/2019 | Zhang | H04W 16/14 |
| 2019/0124694 A1* | 4/2019 | Chendamarai Kannan | H04W 74/004 |
| 2019/0141693 A1* | 5/2019 | Guo | H04W 16/14 |

FOREIGN PATENT DOCUMENTS

| | | |
|---|---|---|
| CN | 107454645 A | 12/2017 |
| EP | 3048851 A | 7/2016 |
| WO | 2017082952 A1 | 5/2017 |

OTHER PUBLICATIONS

CN201780094916.X First Office Action dated Jun. 2, 2022.
CN201780094916.X First Search Report dated May 28, 2022.
QualcommIncorporated "Beamrefinementafterbeamrecoveryorschedulingrequest" 3GPPTSG-RANWG2Meeting#99 R2-1709090 Aug. 12, 2017.

* cited by examiner

METHOD AND DEVICE IN UE AND BASE STATION FOR WIRELESS COMMUNICATION

CROSS REFERENCE TO RELATED APPLICATIONS

This application is a continuation of the U.S. patent application Ser. No. 16/894,893, filed on Jun. 8, 2020, which is a continuation of the International Application No. PCT/CN2017/116893, filed on Dec. 18, 2017, claiming the priority benefit of International Application PCT/CN2017/116893, filed on Dec. 18, 2017, the full disclosure of which is incorporated herein by reference.

BACKGROUND

Technical Field

The disclosure relates to transmission methods and devices in wireless communication systems, and in particular to a method and a device supporting beam management on unlicensed spectrum.

Related Art

In conventional 3rd Generation Partner Project (3GPP) Long-Term Evolution (LTE) systems, data transmission occurs on licensed spectrum only. However, with the sharp increase of data amount, especially in some urban areas, licensed spectrum probably is difficult to meet the requirements of data amount. In Release 13 and Release 14, cellular systems introduce communications on unlicensed spectrum for uplink and downlink transmission of data. In order to ensure compatibility with other access technologies on unlicensed spectrum, a Listen Before Talk (LBT) technology is adopted by Licensed Assisted Access (LAA) to avoid interferences caused by multiple transmitters occupying same frequency resource(s) simultaneously.

At present, technical discussions about 5G New Radio Access Technology (NR) are ongoing, in which massive Multi-Input Multi-Output (MIMO) becomes a research hotspot of next-generation mobile communications. In massive MIMO, in order to ensure that a User Equipment (UE) can switch flexibly between multiple beams, relevant processes of beam management are defined and adopted in 5G NR, in which a UE can dynamically recommend a candidate beam to a base station through a Beam Recovery Request (BRR) so as to replace a current serving beam, then the base station transmits a BRR response through the recommended candidate beam within a predefined time window so as to acknowledge to the UE that the above BRR is known by the base station, and the base station employs the candidate beam to transmit signals in subsequent schedulings. When the above processes are applied to unlicensed spectrum, a new mechanism needs to be designed.

SUMMARY

When the processes of beam management operate on unlicensed spectrum, due to the uncertainty of LBT and the problems of hidden nodes or exposed nodes, even if a base station correctly receives a BRR from a UE, the base station cannot guarantee that a response to the BRR is transmitted to the UE within a given time window like in existing 5G NR systems; meanwhile, when the UE does not receive a response to the BRR, the UE cannot determine whether the response is not received because the recommended candidate beam is not enough for the base station or because the base station cannot pass an LBT on the recommended candidate beam and thus fails to transmit the response. In view of the above problems, one simple method is to view both the above two conditions as a case in which the base station does not receive the BRR, and the UE retransmits a BRR after the given time window. However, this method cannot resolve the problem that the base station fails to transmit a response due to LBT failure; therefore, the UE may still recommend the previously recommended candidate beam. As a consequence, the above method leads to a larger beam recovery latency and an unnecessary retransmission of BRR.

In view of the design, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a UE for wireless communication, wherein the method includes:

receiving a target radio signal;

transmitting a first radio signal in a first time resource pool; and monitoring a first signaling in a second time resource pool in a first frequency domain resource.

Herein, a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received.

In one embodiment, the above method is characterized in that: in 5G NR systems, when a UE recommends a candidate beam, a base station will employ the candidate beam to provide services to the UE; in LAA scenarios, the beam recommended by the UE seams to be optimal on the UE side; however, on the base station side, since other surrounding transmitting nodes share the same one block of resources, the above candidate beam probably cannot pass LBT, thus the base station cannot transmit a response to the candidate beam; however, the above method is to solve this problem.

In one embodiment, the above method has the following benefits: through the first signaling, that is, a physical layer signaling, the base station acknowledges to the UE whether the first radio signal is correctly received; thus, when a BRR response cannot be transmitted due to a reason of LBT in subsequent processes, the UE will know that the beam recommended in the BRR is unavailable on the base station side; thus, the problem that on the base station side there is(are) exposed node(s) not known by the UE is solved.

In one embodiment, the above method has another following benefit: the feedback of the first radio signal is done through the first signaling, thus the UE can know more quickly whether the beam recommended in the BRR is available on the base station side, thereby improving the performance of transmission.

In one embodiment, the above method has yet another following benefit: the first antenna port group is different from the second antenna port group, that is, the base station does not employ the candidate beam recommended by the UE to transmit the first signaling, so as to ensure that the first signaling can be correctly received by the UE.

According to one aspect of the disclosure, the above method includes:

monitoring a second signaling in a third time resource pool in the first frequency domain resource.

Herein, the second signaling is transmitted employing the second antenna port group, and the second signaling is used for determining that the second antenna port group is acknowledged by a transmitter of the second signaling.

In one embodiment, the above method has the following benefits: besides transmitting the first signaling proposed in the disclosure, the base station further transmits the second signaling, that is, the present BRR response; and the UE compares the first signaling and the second signaling, to determine whether the recommended candidate beam is available on the base station side.

According to one aspect of the disclosure, the above method includes:

receiving a third radio signal in the third time resource pool in the first frequency domain resource.

Herein, the first signaling determines that the first radio signal is correctly received and the UE detects the second signaling in the third time resource pool in the first frequency domain resource, and the third radio signal is transmitted employing the second antenna port group.

In one embodiment, the above method is characterized in that: the first signaling indicates that the first radio signal is correctly received, and the UE receives the second signaling, thus the UE determines that the recommended candidate beam is available on the base station; subsequently, the UE employs the recommended beam to receive a candidate radio signal.

According to one aspect of the disclosure, the above method includes:

transmitting a fourth radio signal in the first time resource pool.

Herein, the first signaling determines that the first radio signal is not correctly received, and the fourth radio signal is used for determining the second antenna port group.

In one embodiment, the above method is characterized in that: the first signaling indicates that the first radio signal is not correctly received, then the UE transmits the fourth radio signal so as to retransmit the second antenna port group to the base station.

According to one aspect of the disclosure, the above method includes:

transmitting a fifth radio signal in the first time resource pool.

Herein, the first signaling determines that the first radio signal is correctly received and the UE does not detect the second signaling in the third time resource pool in the first frequency domain resource, the fifth radio signal is used for determining a third antenna port group, and the third antenna port group is different from the second antenna port group.

In one embodiment, the above method is characterized in that: the first signaling indicates that the first radio signal is correctly received, but the UE does not receive the second signaling, it is indicated that the candidate beam recommended by the UE is unavailable on the base station side due to LBT or transmitting interferences from other nodes, thus, the UE transmits the fifth radio signal to recommend an antenna port group corresponding to a suboptimum beam to the base station, that is, the third antenna port group.

According to one aspect of the disclosure, the above method includes:

receiving a candidate radio signal in the first frequency domain resource.

Herein, a channel measurement for the candidate radio signal is used for determining the second antenna port group.

In one embodiment, the above method is characterized in that: the candidate radio signal corresponds to a candidate beam group monitored by the current UE, and the candidate beam in the disclosure belongs to the candidate beam group.

According to one aspect of the disclosure, the above method includes:

receiving first information and second information respectively.

Herein, the first information is used for determining at least one of multiantenna related transmitting of the target radio signal, frequency domain resources occupied by the target radio signal or time domain resources occupied by the target radio signal; the second information is used for determining at least one of multiantenna related transmitting of the candidate radio signal, frequency domain resources occupied by the candidate radio signal or time domain resources occupied by the candidate radio signal; the first information and the second information are transmitted through an air interface.

The disclosure provides a method in a base station for wireless communication, wherein the method includes:

transmitting a target radio signal;

receiving a first radio signal in a first time resource pool; and transmitting a first signaling in a second time resource pool in a first frequency domain resource.

Herein, a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received.

According to one aspect of the disclosure, the above method includes:

transmitting a second signaling in a third time resource pool in the first frequency domain resource.

Herein, the second signaling is transmitted employing the second antenna port group, and the second signaling is used for determining that the second antenna port group is acknowledged by the base station.

According to one aspect of the disclosure, the above method includes:

transmitting a third radio signal in the third time resource pool in the first frequency domain resource.

Herein, the first signaling determines that the first radio signal is correctly received and a transmitter of the first radio signal detects the second signaling in the third time resource pool in the first frequency domain resource, and the third radio signal is transmitted employing the second antenna port group.

According to one aspect of the disclosure, the above method includes:

receiving a fourth radio signal in the first time resource pool.

Herein, the first signaling determines that the first radio signal is not correctly received, and the fourth radio signal is used for determining the second antenna port group.

According to one aspect of the disclosure, the above method includes:

receiving a fifth radio signal in the first time resource pool.

Herein, the first signaling determines that the first radio signal is correctly received and a transmitter of the first radio signal does not detect the second signaling in the third time resource pool in the first frequency domain resource, the fifth radio signal is used for determining a third antenna port group, and the third antenna port group is different from the second antenna port group.

According to one aspect of the disclosure, the above method includes:

transmitting a candidate radio signal in the first frequency domain resource.

Herein, a channel measurement for the candidate radio signal is used for determining the second antenna port group.

According to one aspect of the disclosure, the above method includes:

transmitting first information and second information respectively.

Herein, the first information is used for determining at least one of multiantenna related transmitting of the target radio signal, frequency domain resources occupied by the target radio signal or time domain resources occupied by the target radio signal; the second information is used for determining at least one of multiantenna related transmitting of the candidate radio signal, frequency domain resources occupied by the candidate radio signal or time domain resources occupied by the candidate radio signal; the first information and the second information are transmitted through an air interface.

The disclosure provides a UE for wireless communication, wherein the UE includes:

a first receiver, to receive a target radio signal;

a first transmitter, to transmit a first radio signal in a first time resource pool; and a first transceiver, to monitor a first signaling in a second time resource pool in a first frequency domain resource.

Herein, a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received.

In one embodiment, the above UE for wireless communication is characterized in that: the first transceiver further monitors a second signaling in a third time resource pool in the first frequency domain resource; the second signaling is transmitted employing the second antenna port group, and the second signaling is used for determining that the second antenna port group is acknowledged by a transmitter of the second signaling.

In one embodiment, the above UE for wireless communication is characterized in that: the first transceiver further receives a third radio signal in the third time resource pool in the first frequency domain resource; the first signaling determines that the first radio signal is correctly received and the UE detects the second signaling in the third time resource pool in the first frequency domain resource, and the third radio signal is transmitted employing the second antenna port group.

In one embodiment, the above UE for wireless communication is characterized in that: the first transceiver further transmits a fourth radio signal in the first time resource pool; the first signaling determines that the first radio signal is not correctly received, and the fourth radio signal is used for determining the second antenna port group.

In one embodiment, the above UE for wireless communication is characterized in that: the first transceiver further transmits a fifth radio signal in the first time resource pool; the first signaling determines that the first radio signal is correctly received and the UE does not detect the second signaling in the third time resource pool in the first frequency domain resource, the fifth radio signal is used for determining a third antenna port group, and the third antenna port group is different from the second antenna port group.

In one embodiment, the above UE for wireless communication is characterized in that: the first receiver further receives a candidate radio signal in the first frequency domain resource; a channel measurement for the candidate radio signal is used for determining the second antenna port group.

In one embodiment, the above UE for wireless communication is characterized in that: the first receiver further receives first information and second information respectively; the first information is used for determining at least one of multiantenna related transmitting of the target radio signal, frequency domain resources occupied by the target radio signal or time domain resources occupied by the target radio signal; the second information is used for determining at least one of multiantenna related transmitting of the candidate radio signal, frequency domain resources occupied by the candidate radio signal or time domain resources occupied by the candidate radio signal; the first information and the second information are transmitted through an air interface.

The disclosure provides a base station for wireless communication, wherein the base station includes:

a second transmitter, to transmit a target radio signal;

a second receiver, to receive a first radio signal in a first time resource pool; and a second transceiver, to transmit a first signaling in a second time resource pool in a first frequency domain resource.

Herein, a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received.

In one embodiment, the above base station for wireless communication is characterized in that: the second transceiver further transmits a second signaling in a third time resource pool in the first frequency domain resource; the second signaling is transmitted employing the second antenna port group, and the second signaling is used for determining that the second antenna port group is acknowledged by the base station.

In one embodiment, the above base station for wireless communication is characterized in that: the second transceiver further transmits a third radio signal in the third time resource pool in the first frequency domain resource; the first signaling determines that the first radio signal is correctly received and a transmitter of the first radio signal detects the second signaling in the third time resource pool in the first frequency domain resource, and the third radio signal is transmitted employing the second antenna port group.

In one embodiment, the above base station for wireless communication is characterized in that: the second transceiver further receives a fourth radio signal in the first time resource pool; the first signaling determines that the first radio signal is not correctly received, and the fourth radio signal is used for determining the second antenna port group.

In one embodiment, the above base station for wireless communication is characterized in that: the second transceiver further receives a fifth radio signal in the first time resource pool; the first signaling determines that the first radio signal is correctly received and a transmitter of the first radio signal does not detect the second signaling in the third time resource pool in the first frequency domain resource, the fifth radio signal is used for determining a third antenna port group, and the third antenna port group is different from the second antenna port group.

In one embodiment, the above base station for wireless communication is characterized in that: the second transmitter transmits a candidate radio signal in the first frequency domain resource; a channel measurement for the candidate radio signal is used for determining the second antenna port group.

In one embodiment, the above base station for wireless communication is characterized in that: the second transmitter further transmits first information and second information respectively; the first information is used for determining at least one of multiantenna related transmitting of the target radio signal, frequency domain resources occupied by the target radio signal or time domain resources occupied by the target radio signal; the second information is used for determining at least one of multiantenna related transmitting of the candidate radio signal, frequency domain resources occupied by the candidate radio signal or time domain resources occupied by the candidate radio signal; the first information and the second information are transmitted through an air interface.

In one embodiment, compared with conventional schemes, the disclosure has the following advantages.

Through the first signaling, that is, a physical layer signaling, the base station acknowledges to the UE whether the first radio signal is correctly received; thus, when a BRR response cannot be transmitted due to a reason of LBT in subsequent processes, the UE will know that the beam recommended in the BRR is unavailable on the base station side; thus, the problem that on the base station side there is(are) exposed node(s) not known by the UE is solved.

The feedback of the first radio signal is done through the first signaling, thus the UE can know more quickly whether the beam recommended in the BRR is available on the base station side, thereby improving the performance of transmission.

The first antenna port group is different from the second antenna port group, that is, the base station does not employ the candidate beam recommended by the UE to transmit the first signaling, so as to ensure that the first signaling can be correctly received by the UE.

Besides transmitting the first signaling proposed in the disclosure, the base station further transmits the second signaling, that is, the present BRR response; the UE receives the first signaling and the second signaling to determine whether the recommended candidate beam is available on the base station side, thereby improving the efficiency of beam management process and avoiding recommending a same candidate beam multiple times in the condition of not knowing base station side interferences.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
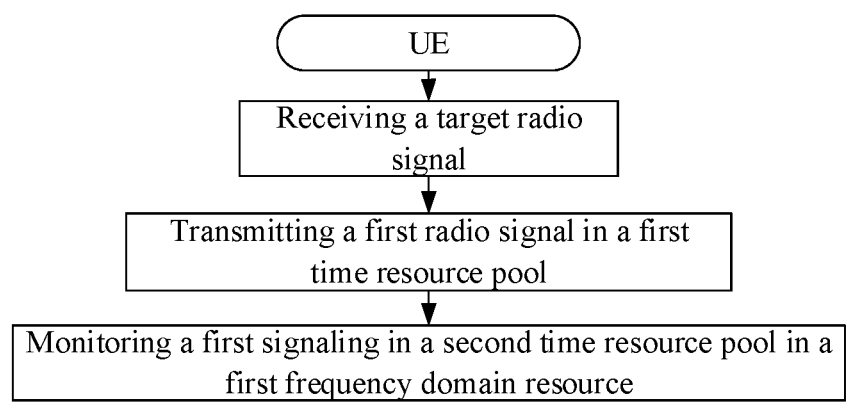
FIG. 1 is a flowchart of a first radio signal according to one embodiment of the disclosure.

Embodiment 1 illustrates an example of a flowchart of a first radio signal, as shown in FIG. 1.

In Embodiment 1, the UE in the disclosure first receives a target radio signal, then transmits a first radio signal in a first time resource pool, and finally monitors a first signaling in a second time resource pool in a first frequency domain resource; a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received.

In one subembodiment, the target radio signal is received by the UE in the first frequency domain resource.

In one subembodiment, the phrase monitoring a first signaling refers to blind decoding the first signaling.

In one subembodiment, the first radio signal includes a BRR.

In one subembodiment, the first radio signal includes a Physical Random Access Channel (PRACH).

In one subembodiment, the first signaling includes a first field, and the first field is used for determining whether the first radio signal is correctly received.

In one affiliated embodiment of the above subembodiment, the first field includes 1 bit, and the 1 bit is used for determining whether the first radio signal is correctly received.

In one subembodiment, the first signaling is one Downlink Control Information (DCI).

In one subembodiment, the first signaling is one downlink grant, or the first signaling is one uplink grant.

In one subembodiment, the first radio signal includes a Physical Uplink Control Channel (PUCCH).

In one subembodiment, the first frequency domain resource is deployed on unlicensed spectrum.

In one subembodiment, the first frequency domain resource is one carrier.

In one subembodiment, the first frequency domain resource is one Bandwidth Part (BWP).

In one subembodiment, the first radio signal is transmitted in the first frequency domain resource.

In one subembodiment, the first antenna port group includes P1 antenna port(s), the P1 is equal to 1 or the P1 is a positive integer greater than 1.

In one subembodiment, the second antenna port group includes P2 antenna port(s), the P2 is equal to 1 or the P2 is a positive integer greater than 1.

In one subembodiment, the phrase that the first antenna port group is different from the second antenna port group refers that: among antenna ports included in the first antenna port group, at least one antenna port does not belong to antenna ports included in the second antenna port group.

In one subembodiment, the phrase that the first antenna port group is different from the second antenna port group refers that: among antenna ports included in the second antenna port group, at least one antenna port does not belong to antenna ports included in the first antenna port group.

In one subembodiment, the phrase that the first antenna port group is different from the second antenna port group refers that: the first antenna port group corresponds to a first Reference Signal (RS) resource configuration index, the second antenna port group corresponds to a second RS resource configuration index, and the first RS resource configuration index is not equal to the second RS resource configuration index.

In one affiliated embodiment of the above subembodiment, the RS is a Channel State Information Reference Signal (CSI-RS).

In one subembodiment, the phrase that the first antenna port group is different from the second antenna port group refers that: the first antenna port group and the second antenna port group correspond to different transmitting beamforming vectors respectively.

In one subembodiment, the phrase that the first antenna port group is different from the second antenna port group refers that: the first antenna port group and the second antenna port group are not spatially Quasi-Coloated (QCLed).

In one subembodiment, the first time resource pool includes a positive integer number of first time resource subpools, and the first time resource subpool includes a positive integer number of consecutive multicarrier symbols in time domain.

In one subembodiment, the second time resource pool includes a positive integer number of second time resource subpools, and second time resource subpool includes a positive integer number of consecutive multicarrier symbols in time domain.

In one affiliated embodiment of the above subembodiment, the UE monitors the first signaling in the second time resource subpool included in a first time window.

In one example of the above affiliated embodiment, the UE transmits the first radio signal in a first time unit, and the first time window is located behind the first time unit in time domain.

In one example of the above affiliated embodiment, the UE transmits the first radio signal in a first time unit, the first time window and the first time unit have an interval not less than Ti ms, the Ti is fixed, or the Ti is configured through a higher layer signaling, and the Ti is a real number greater than 0.

In one example of the above affiliated embodiment, the first time window has a fixed duration, or the duration of the first time window is configured through a higher layer signaling.

In one subembodiment, the first time resource pool and the second time resource pool are correlated.

In one affiliated embodiment of the above subembodiment, the phrase that the first time resource pool and the second time resource pool are correlated refers that: the first time resource pool includes a positive integer number of first time resource subpools, the second time resource pool includes a positive integer number of second time resource subpools, and any one of the first time resource subpools can find one second time resource subpool corresponding to it.

In one affiliated embodiment of the above subembodiment, the second time resource pool is used for the base station in the disclosure to transmit a given Synchronization Signal Block (SSB), and the first time resource pool is used for receiving a random access request for the given SSB.

In one example of the above affiliated embodiment, for the UE, multiantenna related receiving of the given SSB is used for determining multiantenna related transmitting of the first radio signal.

In one exception of the above example, the phrase that multiantenna related receiving of the given SSB is used for determining multiantenna related transmitting of the first radio signal refers that: when transmitting the first radio signal, the UE employs the same spatial domain transmission filter as receiving the given SSB.

In one subembodiment, the UE monitors the first signaling in a first frequency domain resource pool in the second time resource pool.

In one affiliated embodiment of the above subembodiment, the first frequency domain resource pool corresponds to one Control Resource Set (CORESET).

In one subembodiment, the phrase that an antenna port group #1 and an antenna port group #2 are not spatially QCLed refers that: any one antenna port in the antenna port group #1 and any one antenna port in the antenna port group #2 are not spatially QCLed.

In one subembodiment, the phrase that an antenna port group #1 and an antenna port group #2 are not spatially QCLed refers that: full or partial large-scale properties of radio signals transmitted on the antenna port group #2 cannot be deduced from full or partial large-scale properties of radio signals transmitted on the antenna port group #1.

In one subembodiment, the phrase that an antenna port group #1 and an antenna port group #2 are not spatially QCLed refers that: multiantenna related receiving of radio signals transmitted on the antenna port group #2 cannot be deduced from multiantenna related receiving of radio signals transmitted on the antenna port group #1.

In one subembodiment, the phrase that an antenna port group #1 and an antenna port group #2 are not spatially QCLed refers that: multiantenna related transmitting of radio signals transmitted on the antenna port group #2 cannot be deduced from multiantenna related transmitting of radio signals transmitted on the antenna port group #1.

In one subembodiment, the phrase that an antenna port group #1 and an antenna port group #2 are not spatially QCLed refers that: at least one QCL parameter of the antenna port group #2 cannot be deduced from at least one QCL parameter of the antenna port group #1.

In one subembodiment, the given antenna port group corresponds to the first antenna port group in the disclosure, and the target antenna port group corresponds to the second antenna port group in the disclosure.

In one subembodiment, the QCL parameter in the disclosure includes one or more of angle of arrival, angle of departure, spatial correlation, multiantenna related transmitting or multiantenna related receiving.

In one subembodiment, the large-scale property in the disclosure includes one or more of delay spread, Doppler spread, Doppler shift, path loss or average gain.

In one subembodiment, the UE in the disclosure needs to perform a process of channel detection before performing any transmission illustrated in the disclosure.

In one affiliated embodiment of the above subembodiment, the channel detection is an energy detection.

In one affiliated embodiment of the above subembodiment, the channel detection is an LBT, or the channel detection is a CCA.

In one affiliated embodiment of the above subembodiment, the channel detection is a channel detection of the first frequency domain resource.

In one subembodiment, the multicarrier symbol in the disclosure is one of an Orthogonal Frequency Division Multiplexing (OFDM) symbol, a Single-Carrier Frequency Division Multiple Access (SC-FDMA) symbol, a Filter Bank Multi Carrier (FBMC) symbol, an OFDM symbol including a CP or a Discrete Fourier Transform Spreading Orthogonal Frequency Division Multiplexing (DFT-s-OFDM) symbol including a CP.

Embodiment 2

Figure 2:
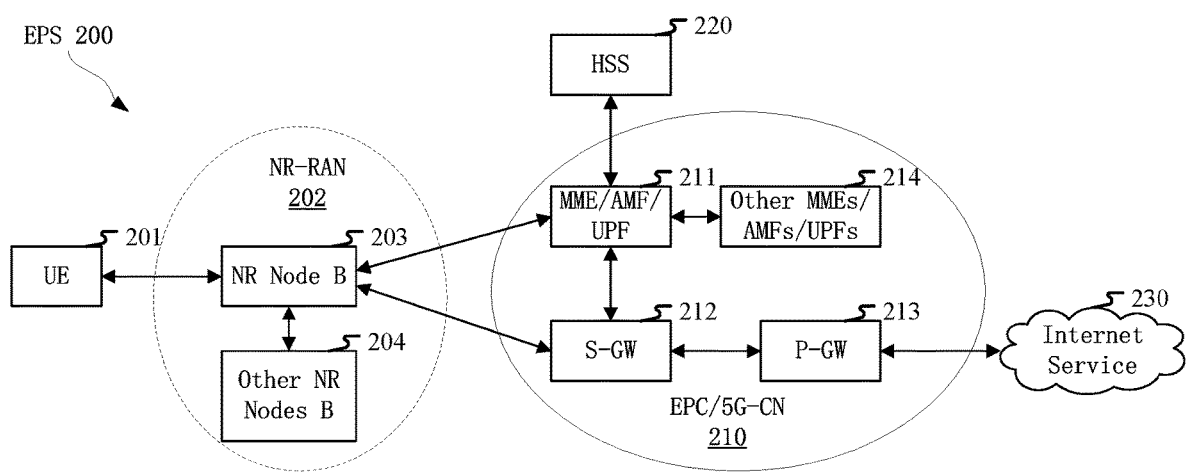
FIG. 2 is a diagram illustrating a network architecture according to one embodiment of the disclosure.

Embodiment 2 illustrates an example of a diagram of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes a NR node (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-territorial network base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 supports wireless communications of data transmission on unlicensed spectrum.

In one subembodiment, the gNB 203 supports wireless communications of data transmission on unlicensed spectrum.

In one subembodiment, the UE 201 supports massive MIMO wireless communications.

In one subembodiment, the gNB 203 supports massive MIMO wireless communications.

Embodiment 3

Figure 3:
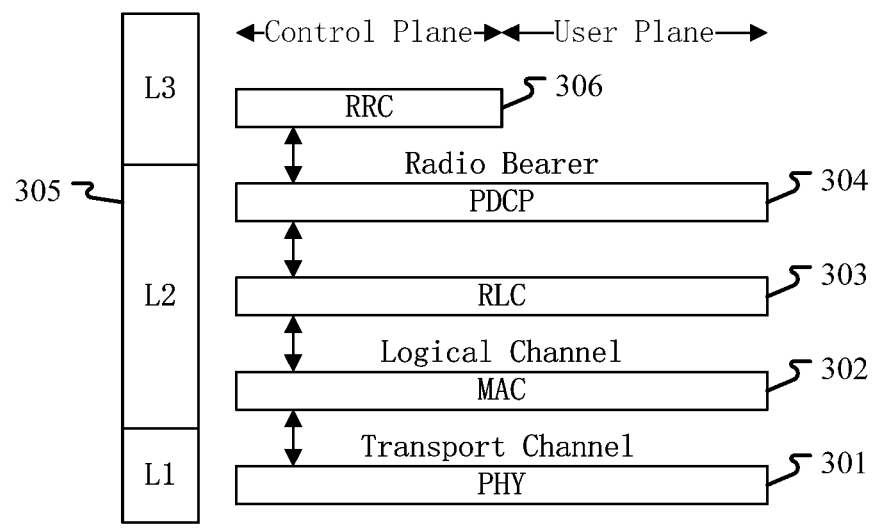
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the first signaling in the disclosure is generated on the PHY 301.

In one subembodiment, the second signaling in the disclosure is generated on the MAC sublayer 302, or generated on the RRC sublayer 306.

In one subembodiment, the first radio signal in the disclosure is generated on the PHY 301, or the first radio signal in the disclosure is generated on the MAC sublayer 302.

In one subembodiment, the third radio signal in the disclosure is generated on the PHY 301.

In one subembodiment, the fourth radio signal in the disclosure is generated on the PHY 301, or the fourth radio signal in the disclosure is generated on the MAC sublayer 302.

In one subembodiment, the fifth radio signal in the disclosure is generated on the PHY 301, or the fifth radio signal in the disclosure is generated on the MAC sublayer 302.

Embodiment 4

Figure 4:
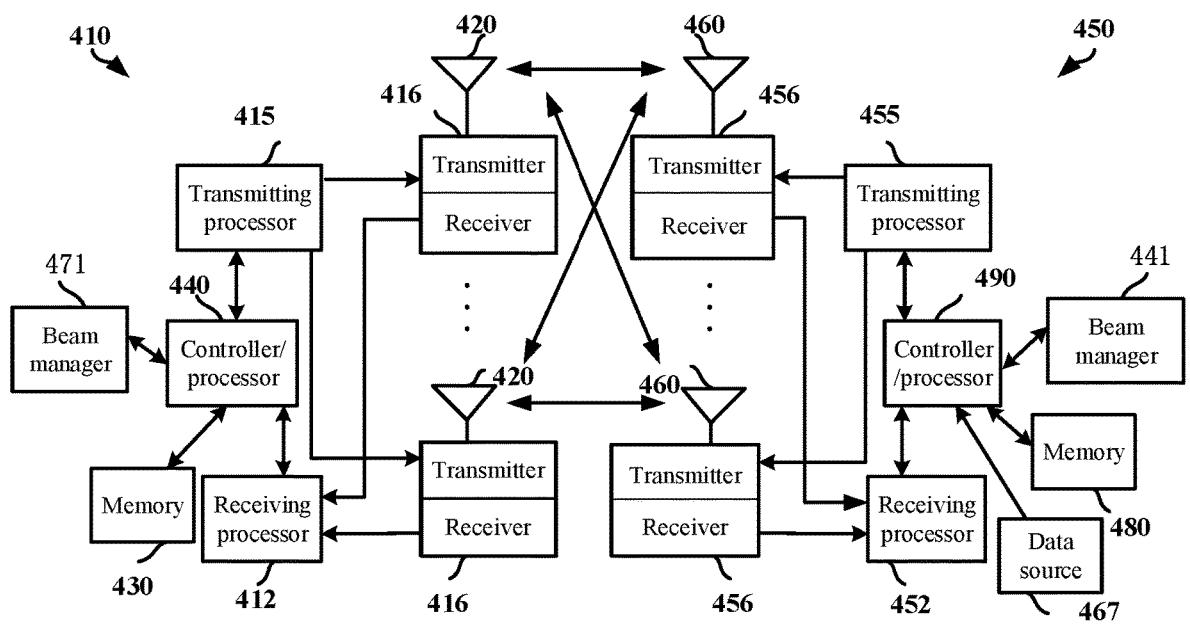
FIG. 4 is a diagram illustrating an eNB and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In UL transmission, processes relevant to the base station 410 include the following.

The receiver 416 receives a radio-frequency signal via the corresponding antenna 420, converts the received radio-frequency signal into a baseband signal and provides the baseband signal to the receiving processor 412.

The receiving processor 412 performs various signal receiving processing functions of an L1 layer (that is, PHY), including decoding, de-interleaving, descrambling, demodulation, extraction of physical layer control signaling, etc.

The controller/processor 440 performs functions of L2 layer, and is connected to the memory 430 that stores program codes and data.

The controller/processor 440 provides de-multiplexing between a logical channel and a transport channel, packet reassembling, decryption, header decompression and control signaling processing to recover a higher-layer packet from the UE 450. The higher-layer packet from the UE 450 may be provided to the core network.

The beam manager 441 determines to receive a first radio signal in a first time resource pool and to transmit a first signaling in a second time resource pool in a first frequency domain resource, and transmits the result to the controller/processor 440.

In Uplink (UL) transmission, processes relevant to the UE 450 include the following.

The data source 467 provides a higher-layer packet to the controller/processor 490. The data source 467 represents all protocol layers above L2 layer.

The transmitter 456 transmits a radio-frequency signal via the corresponding antenna 460, converts a baseband signal into a radio-frequency signal and provides the radio-frequency radio to the corresponding antenna 460.

The transmitting processor 455 performs various signal receiving processing functions of an L1 layer (that is, PHY), including decoding, deinterleaving, descrambling, demodulation and extraction of physical layer control signalings, etc.

The controller/processor 490 provides header compression, encryption, packet segmentation and reordering, multiplexing between a logical channel and a transport channel based on radio resource allocation of the gNB 410, to implement the L2 functions used for the user plane and the control plane.

The controller/processor 459 is also in charge of HARQ operation, retransmission of lost packets, and signalings to the gNB 410.

The beam manager 471 determines to transmit a first radio signal in a first time resource pool and to monitor a first signaling in a second time resource pool in a first frequency domain resource, and transmits the result to the controller/processor 490.

In Downlink (DL) transmission, processes relevant to the base station 410 include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit for transmission requirements, and the scheduling unit is configured to schedule air interface resources corresponding to transmission requirements.

The beam manager 441 determines to receive a first radio signal in a first time resource pool and to transmit a first signaling in a second time resource pool in a first frequency domain resource, and transmits the result to the controller/processor 440.

The transmitting processor 415 receives a bit stream output from the controller/processor 440, and performs various signal transmitting processing functions of L1 layer (that is, PHY), including encoding, interleaving, scrambling, modulation, power control/allocation, generation of physical layer control signalings (including PBCH, PDCCH, PHICH, PCFICH, reference signal), etc.

The transmitter 416 is configured to convert the baseband signal provided by the MIMO transmitting processor 441 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In Downlink (DL) transmission, processes relevant to the UE 450 include the following.

The receiver 456 is configured to convert a radio-frequency signal received via the antenna 460 into a baseband signal and provide the baseband signal to receiving processor 452.

The receiving processor 452 performs various signal receiving processing functions of an L1 layer (that is, PHY), including decoding, de-interleaving, descrambling, demodulation, extraction of physical layer control signaling, etc.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The beam manager 471 determines to transmit a first radio signal in a first time resource pool and to monitor a first signaling in a second time resource pool in a first frequency domain resource, and transmits the result to the controller/processor 490.

The controller/processor 490 is connected to the memory 480 that stores program codes and data. The memory 480 may be a computer readable medium.

In one subembodiment, the UE 450 includes at least one processor and at least one memory. The at least one memory includes computer program codes. The at least one memory and the computer program codes are configured to be used in collaboration with the at least one processor. The UE 450 at least receives a target radio signal, transmits a first radio signal in a first time resource pool, and monitors a first signaling in a second time resource pool in a first frequency domain resource; a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received.

In one subembodiment, the UE 450 includes a memory that stores a computer readable instruction program. The computer readable instruction program generates an action when executed by at least one processor. The action includes: receiving a target radio signal, transmitting a first radio signal in a first time resource pool, and monitoring a first signaling in a second time resource pool in a first frequency domain resource; a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received.

In one subembodiment, the gNB 410 includes at least one processor and at least one memory. The at least one memory includes computer program codes. The at least one memory and the computer program codes are configured to be used in collaboration with the at least one processor. The gNB 410 at least transmits a target radio signal, receives a first radio signal in a first time resource pool, and transmits a first signaling in a second time resource pool in a first frequency domain resource; a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received.

In one embodiment, the gNB 410 includes a memory that stores a computer readable instruction program. The computer readable instruction program generates an action when executed by at least one processor. The action includes transmitting a target radio signal, receiving a first radio signal in a first time resource pool, and transmitting a first signaling in a second time resource pool in a first frequency domain resource; a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received.

In one subembodiment, the UE 450 corresponds to the UE in the disclosure.

In one subembodiment, the gNB 410 corresponds to the base station in the disclosure.

In one subembodiment, the beam manager 441 is used for determining to transmit a first radio signal in a first time resource pool and monitor a first signaling in a second time resource pool in a first frequency domain resource.

In one subembodiment, the beam manager 441 is used for determining to receive a third radio signal in a third time resource pool in a first frequency domain resource.

In one subembodiment, the beam manager 441 is used for determining to transmit a fourth radio signal in a first time resource pool.

In one subembodiment, the beam manager 441 is used for determining to transmit a fifth radio signal in a first time resource pool.

In one subembodiment, at least the former two of the receiver 456, the receiving processor 452 and the controller/processor 490 are used for receiving a target radio signal.

In one subembodiment, at least the former two of the transmitter 456, the transmitting processor 455 and the controller/processor 490 are used for transmitting a first radio signal in a first time resource pool.

In one subembodiment, at least the former two of the receiver 456, the receiving processor 452 and the controller/processor 490 are used for monitoring a first signaling in a second time resource pool in a first frequency domain resource.

In one subembodiment, at least the former two of the receiver 456, the receiving processor 452 and the controller/processor 490 are used for monitoring a second signaling in a third time resource pool in a first frequency domain resource.

In one subembodiment, at least the former two of the receiver 456, the receiving processor 452 and the controller/processor 490 are used for receiving a third radio signal in a third time resource pool in a first frequency domain resource.

In one subembodiment, at least the former two of the transmitter 456, the transmitting processor 455 and the controller/processor 490 are used for transmitting a fourth radio signal in a first time resource pool.

In one subembodiment, at least the former two of the transmitter 456, the transmitting processor 455 and the controller/processor 490 are used for transmitting a fifth radio signal in a first time resource pool.

In one subembodiment, at least the former two of the receiver 456, the receiving processor 452 and the controller/processor 490 are used for receiving a candidate radio signal in a first frequency domain resource.

In one subembodiment, at least the former two of the receiver 456, the receiving processor 452 and the controller/processor 490 are used for receiving first information and second information respectively.

In one subembodiment, the beam manager 471 is used for determining to receive a first radio signal in a first time resource pool and transmit a first signaling in a second time resource pool in a first frequency domain resource.

In one subembodiment, the beam manager 471 is used for determining to transmit a third radio signal in a third time resource pool in a first frequency domain resource.

In one subembodiment, the beam manager 471 is used for determining to receive a fourth radio signal in a first time resource pool.

In one subembodiment, the beam manager 471 is used for determining to receive a fifth radio signal in a first time resource pool.

In one subembodiment, at least the former two of the transmitter 416, the transmitting processor 415 and the controller/processor 440 are used for transmitting a target radio signal.

In one subembodiment, at least the former two of the receiver 412, the receiving processor 415 and the controller/processor 440 are used for receiving a first radio signal in a first time resource pool.

In one subembodiment, at least the former two of the transmitter 416, the transmitting processor 415 and the controller/processor 440 are used for transmitting a first signaling in a second time resource pool in a first frequency domain resource.

In one subembodiment, at least the former two of the transmitter 416, the transmitting processor 415 and the controller/processor 440 are used for transmitting a second signaling in a third time resource pool in a first frequency domain resource.

In one subembodiment, at least the former two of the transmitter 416, the transmitting processor 415 and the controller/processor 440 are used for transmitting a third radio signal in a third time resource pool in a first frequency domain resource.

In one subembodiment, at least the former two of the receiver 412, the receiving processor 415 and the controller/processor 440 are used for receiving a fourth radio signal in a first time resource pool.

In one subembodiment, at least the former two of the receiver 412, the receiving processor 415 and the controller/processor 440 are used for receiving a fifth radio signal in a first time resource pool.

In one subembodiment, at least the former two of the transmitter 416, the transmitting processor 415 and the controller/processor 440 are used for transmitting a candidate radio signal in a first frequency domain resource.

In one subembodiment, at least the former two of the transmitter 416, the transmitting processor 415 and the controller/processor 440 are used for transmitting first information and second information respectively.

Embodiment 5

Figure 5:
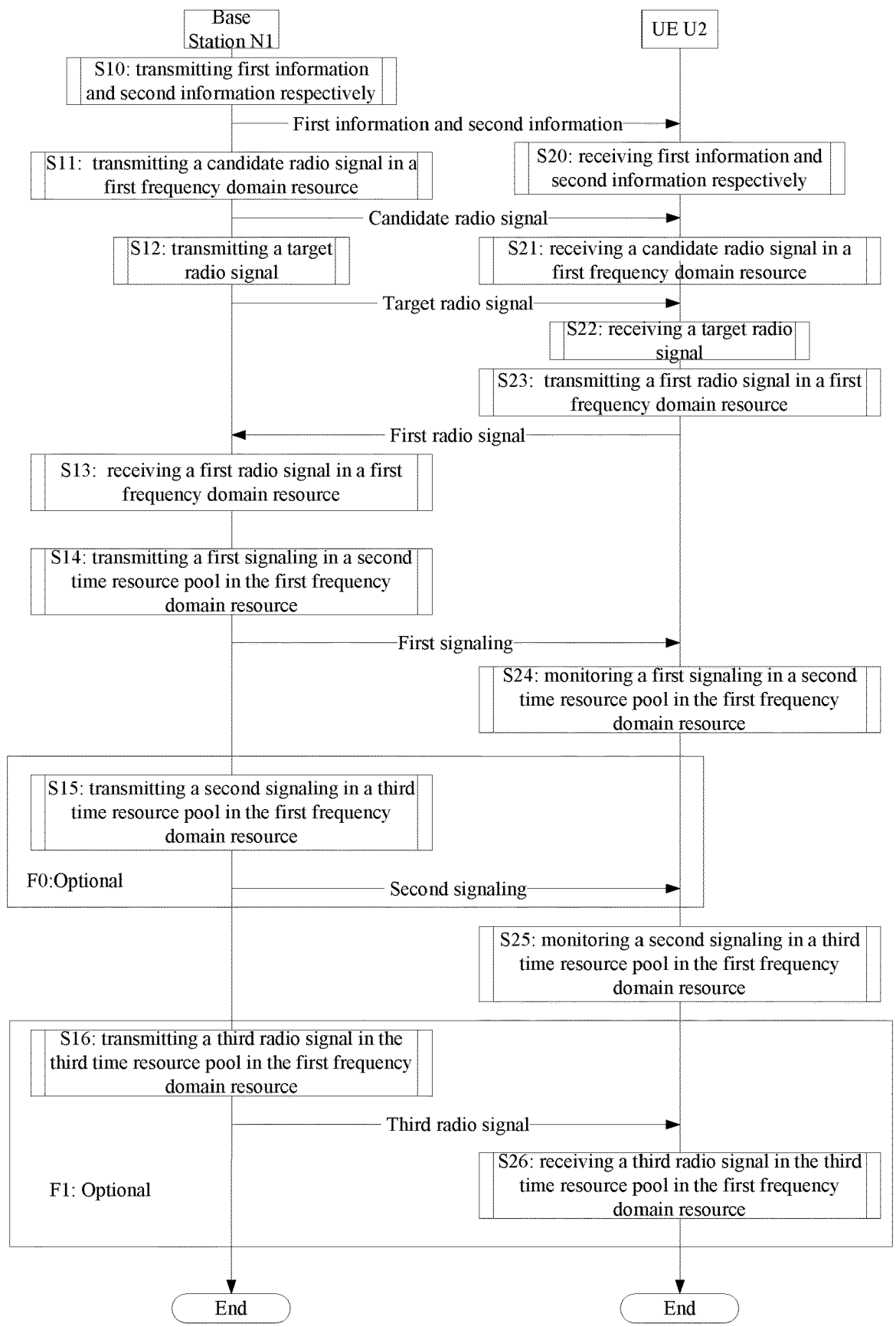
FIG. 5 is a flowchart of a first signaling according to one embodiment of the disclosure.

Embodiment 5 illustrates an example of a flowchart of a first signaling, as shown in FIG. 5. In FIG. 5, a base station N1 is a maintenance base station for a serving cell of a UE U2. Steps in box F0 and box F1 are optional.

The base station N1 transmits first information and second information respectively in S10, transmits a candidate radio signal in a first frequency domain resource in S11, transmits a target radio signal in S12, receives a first radio signal in a first time resource pool in S13, transmits a first signaling in a second time resource pool in the first frequency domain resource in S14, transmits a second signaling in a third time resource pool in the first frequency domain resource in S15, and transmits a third radio signal in the third time resource pool in the first frequency domain resource in S16.

The UE U2 receives first information and second information respectively in S20, receives a candidate radio signal in a first frequency domain resource in S21, receives a target radio signal in S22, transmits a first radio signal in a first time resource pool in S23, monitors a first signaling in a second time resource pool in the first frequency domain resource in S24, monitors a second signaling in a third time resource pool in the first frequency domain resource in S25, and receives a third radio signal in the third time resource pool in the first frequency domain resource in S26.

In Embodiment 5, a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received; the second signaling is transmitted employing the second antenna port group, and the second signaling is used for determining that the second antenna port group is acknowledged by the base station N1; the first signaling determines that the first radio signal is correctly received and the UE U2 detects the second signaling in the third time resource pool in the first frequency domain resource, and the third radio signal is transmitted employing the second antenna port group.

In one subembodiment, S11 and S12 of the base station N1 in Embodiment 5 may be interchanged in the sequence.

In one subembodiment, S21 and S22 of the UE U2 in Embodiment 5 may be interchanged in the sequence.

In one subembodiment, the first radio signal is one PRACH, and the second signaling is one DCI scrambled with a Random Access Radio Network Temporary Identifier (RA-RNTI).

In one subembodiment, the second signaling is one Medium Access Control (MAC) signaling.

In one subembodiment, the second signaling is one BRR response.

In one subembodiment, the UE U2 monitors the second signaling in a second frequency domain resource pool in the third time resource pool.

In one affiliated embodiment of the above subembodiment, the second frequency domain resource pool corresponds to one CORESET.

In one subembodiment, the third time resource pool is related to the second antenna port group.

In one subembodiment, the second antenna port group is used for determining the third time resource pool.

In one subembodiment, the phrase that the second signaling is used for determining that the second antenna port group is acknowledged by the base station N1 refers that: the base station N1 informs the UE U2 through the second signaling that subsequent schedulings for the UE U2 will be transmitted using the second antenna port group.

In one subembodiment, the phrase that the second signaling is used for determining that the second antenna port group is acknowledged by the base station N1 refers that: the base station N1 informs, through the second signaling, the UE U2 to employ the second antenna port group to receive subsequent schedulings for the UE U2.

In one subembodiment, the third radio signal is one Physical Downlink Shared Channel (PDSCH).

In one subembodiment, the third radio signal is one DCI.

In one subembodiment, the third radio signal is one downlink grant, or the third radio signal is one uplink grant.

In one subembodiment, the third time resource pool includes a positive integer number of third time resource subpools, the UE monitors the second signaling in a second frequency domain resource pool in one third time resource subpool, and receives the third radio signal in the second frequency domain resource pool in another third time resource subpool.

In one subembodiment, before transmitting the first signaling in a second time resource pool in a first frequency domain resource, the base station N1 performs a channel detection of the first frequency domain resource employing the first antenna port group, and determines that the first frequency domain resource is idle.

In one affiliated embodiment of the above subembodiment, the above channel detection is an energy detection.

In one affiliated embodiment of the above subembodiment, the above channel detection is a process of LBT.

In one affiliated embodiment of the above subembodiment, the above channel detection is a process of Clear Channel Assessment (CCA).

In one affiliated embodiment of the above subembodiment, the phrase that performing a channel detection of the first frequency domain resource employing the first antenna port group refers to: performing a channel detection of the first frequency domain resource employing a beamforming vector corresponding to the first antenna port group.

In one affiliated embodiment of the above subembodiment, the phrase that performing a channel detection of the first frequency domain resource employing the first antenna port group refers to: performing a channel detection of the first frequency domain resource employing at least one of antenna ports included in the first antenna port group.

In one affiliated embodiment of the above subembodiment, the phrase that performing a channel detection of the first frequency domain resource employing the first antenna port group refers that: judging whether the first frequency domain resource is idle employing a given receiving energy, wherein the given receiving energy refers to a receiving energy of at least one of antenna ports included in the first antenna port group in a frequency domain resource corresponding to the first frequency domain resource.

In one subembodiment, before transmitting a second signaling in a third time resource pool in a first frequency domain resource, the base station N1 performs a channel detection of the first frequency domain resource employing the second antenna port group, and determines that the first frequency domain resource is idle.

In one affiliated embodiment of the above subembodiment, the above channel detection is an energy detection.

In one affiliated embodiment of the above subembodiment, the above channel detection is a process of LBT.

In one affiliated embodiment of the above subembodiment, the above channel detection is a process of CCA.

In one affiliated embodiment of the above subembodiment, the phrase that performing a channel detection of the first frequency domain resource employing the second antenna port group refers to: performing a channel detection of the first frequency domain resource employing a beamforming vector corresponding to the second antenna port group.

In one affiliated embodiment of the above subembodiment, the phrase that performing a channel detection of the first frequency domain resource employing the second antenna port group refers to: performing a channel detection of the first frequency domain resource employing at least one of antenna ports included in the second antenna port group.

In one affiliated embodiment of the above subembodiment, the phrase that performing a channel detection of the first frequency domain resource employing the second antenna port group refers to: judging whether the first frequency domain resource is idle employing a given receiving energy, wherein the given receiving energy refers to a receiving energy of at least one of antenna ports included in the second antenna port group in a frequency domain resource corresponding to the first frequency domain resource.

In one subembodiment, the first information is used for determining multiantenna related transmitting of the target radio signal.

In one subembodiment, the first information is used for determining frequency domain resources occupied by the target radio signal.

In one subembodiment, the first information is used for determining time domain resources occupied by the target radio signal.

In one subembodiment, the first information is configured through an RRC signaling.

In one subembodiment, the second information is used for determining multiantenna related transmitting of the candidate radio signal.

In one subembodiment, the second information is used for determining frequency domain resources occupied by the candidate radio signal.

In one subembodiment, the second information is used for determining time domain resources occupied by the candidate radio signal.

In one subembodiment, the second information is configured through an RRC signaling.

In one subembodiment, the air interface is wireless.

In one subembodiment, the air interface includes a wireless channel.

In one subembodiment, the air interface is an interface between a base station and the UE.

In one subembodiment, the air interface is an Uu interface.

In one subembodiment, the air interface corresponds to the wireless channel between UE 201 and NR node B203 shown in FIG. 2.

Embodiment 6

Figure 6:
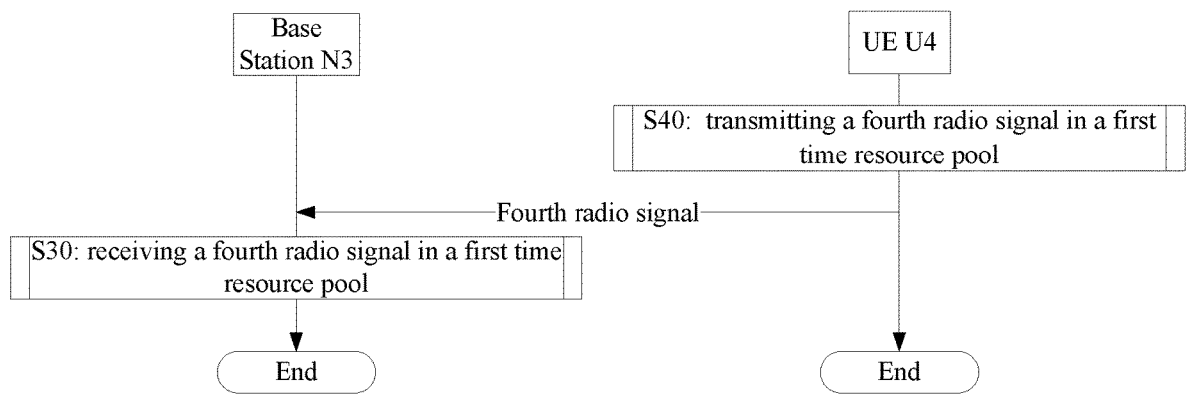
FIG. 6 is a flowchart of a fourth radio signal according to one embodiment of the disclosure.

Embodiment 6 illustrates an example of a flowchart of a fourth radio signal, as shown in FIG. 6. In FIG. 6, a base station N3 is a maintenance base station for a serving cell of a UE U4.

The base station N3 receives a fourth radio signal in a first time resource pool.

The UE U4 transmits a fourth radio signal in a first time resource pool.

In Embodiment 6, the first signaling in the disclosure determines that the first radio signal in the disclosure is not correctly received, and the fourth radio signal is used for determining the second antenna port group in the disclosure.

In one subembodiment, the fourth radio signal is a retransmission of the first radio signal in the disclosure.

In one subembodiment, the first signaling determines that the first radio signal is not correctly received and the UE does not detect the second signaling in the third time resource pool in the first frequency domain resource.

In one affiliated embodiment of the above subembodiment, the base station N3 cannot determine the second antenna port group through the first radio signal, thus cannot transmit the second signaling through the second antenna port group, then the base station N3 drops transmitting of the second signaling.

In one affiliated embodiment of the above subembodiment, before transmitting the second signaling, the base station N3 performs a channel detection of the first frequency domain resource employing the second antenna port group, the first frequency domain resource is busy, and the base station N3 drops transmitting of the second signaling.

Embodiment 7

Figure 7:
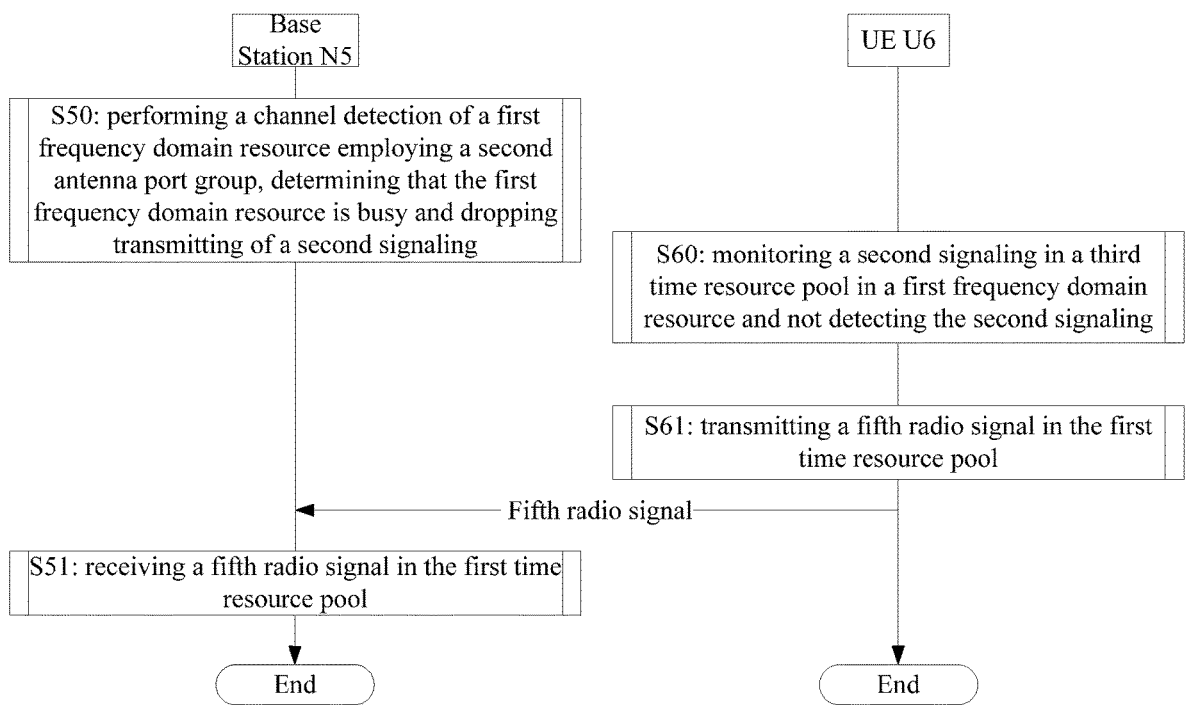
FIG. 7 is a flowchart of a fifth radio signal according to one embodiment of the disclosure.

Embodiment 7 illustrates an example of a flowchart of a fifth radio signal, as shown in FIG. 7. In FIG. 7, a base station N5 is a maintenance base station for a serving cell of a UE U6.

The base station N5 performs a channel detection of the first frequency domain resource employing the second antenna port group, determines that the first frequency domain resource is busy and drops transmitting of the second signaling in S50, and receives a fifth radio signal in the first time resource pool in S51.

The UE U6 monitors a second signaling in a third time resource pool in a first frequency domain resource and does not detect the second signaling in S60, and transmits a fifth radio signal in the first time resource pool in S61.

In Embodiment 7, the first signaling in the disclosure determines that the first radio signal in the disclosure is correctly received and the UE U6 does not detect the second signaling in the third time resource pool in the first frequency domain resource, the fifth radio signal is used for determining a third antenna port group, and the third antenna port group is different from the second antenna port group.

In one subembodiment, the phrase that the third antenna port group is different from the second antenna port group refers that: among antenna ports included in the third antenna port group, at least one antenna port does not belong to antenna ports included in the second antenna port group.

In one subembodiment, the phrase that the third antenna port group is different from the second antenna port group refers that: among antenna ports included in the second antenna port group, at least one antenna port does not belong to antenna ports included in the third antenna port group.

In one subembodiment, the phrase that the third antenna port group is different from the second antenna port group refers that: the third antenna port group corresponds to a third RS resource configuration index, the second antenna port group corresponds to a second RS resource configuration index, and the third RS resource configuration index is not equal to the second RS resource configuration index.

In one subembodiment, the phrase that the third antenna port group is different from the second antenna port group refers that: the third antenna port group and the second antenna port group correspond to different transmitting beamforming vectors respectively.

In one subembodiment, the phrase that the third antenna port group is different from the second antenna port group refers that: the third antenna port group and the second antenna port group are not spatially QCLed.

In one subembodiment, the channel detection is an energy detection.

In one subembodiment, the channel detection is a process of LBT.

In one subembodiment, the channel detection is a CCA.

In one subembodiment, the phrase that performing a channel detection of the first frequency domain resource employing the second antenna port group refers to: performing a channel detection of the first frequency domain resource employing a beamforming vector corresponding to the second antenna port group.

In one subembodiment, the phrase that performing a channel detection of the first frequency domain resource employing the second antenna port group refers to: performing a channel detection of the first frequency domain resource employing at least one of antenna ports included in the second antenna port group.

In one subembodiment, the phrase that performing a channel detection of the first frequency domain resource employing the second antenna port group refers to: judging whether the first frequency domain resource is idle employing a given receiving energy, wherein the given receiving energy refers to a receiving energy of at least one of antenna ports included in the second antenna port group in a frequency domain resource corresponding to the first frequency domain resource.

Embodiment 8

Figure 8:
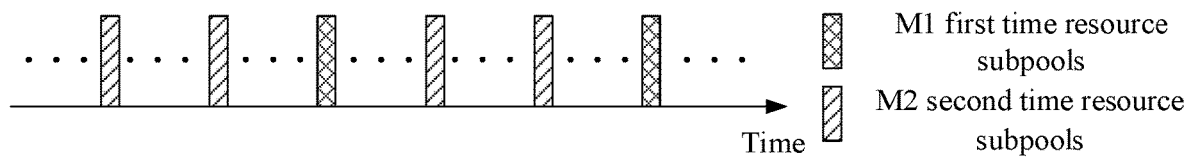
FIG. 8 is a diagram illustrating a first time resource pool and a second time resource pool according to one embodiment of the disclosure.

Embodiment 8 illustrates an example of a diagram of a first time resource pool and a second time resource pool, as shown in FIG. 8. In Embodiment 8, the first time resource pool includes M1 first time resource subpools, and the second time resource pool includes M2 second time resource subpools; any one of the M1 first time resource subpools includes a positive integer number of consecutive multicarrier symbols in time domain, and any one of the M2 second time resource subpools includes a positive integer number of consecutive multicarrier symbols in time domain.

In one subembodiment, for the UE in the disclosure, the M2 second time resource subpools are used for receiving a given SSB.

In one affiliated embodiment of the above subembodiment, for the UE in the disclosure, the M1 first time resource subpools are used for transmitting a given random access request for the SSB.

In one affiliated embodiment of the above subembodiment, multiantenna related receiving of the given SSB is used for determining multiantenna related transmitting of the given random access request.

In one affiliated embodiment of the above subembodiment, an index corresponding to the given SSB is used for determining positions of the M2 second time resource subpools in time domain.

In one subembodiment, positions of the M1 first time resource subpools in time domain are used for determining positions of the M2 second time resource subpools in time domain.

In one subembodiment, the M1 is equal to the M2, and the M1 first time resource subpools are one-to-one corresponding to the M2 second time resource subpools.

In one subembodiment, the M2 is equal to a product of P and M1, the P is a positive integer greater than 1, P consecutive second time resource subpools among M2 second time resource subpools correspond to one first time resource subpool.

In one subembodiment, the M1 first time resource subpools are discrete in time domain.

In one subembodiment, the M1 first time resource subpools are periodically distributed in time domain.

In one subembodiment, the M2 second time resource subpools are discrete in time domain.

In one subembodiment, the M2 second time resource subpools are periodically distributed in time domain.

In one subembodiment, any one of the M1 first time resource subpools is orthogonal to any one of the M2 second time resource subpools.

In one subembodiment, time domain positions occupied by the M2 second time resource subpools are configured through an RRC signaling.

In one subembodiment, there is(are) unoccupied multicarrier symbol(s) between any one first time resource subpool and any one second time resource subpool.

Embodiment 9

Figure 9:
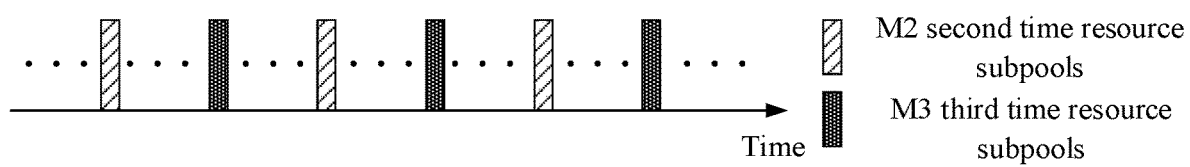
FIG. 9 is a diagram illustrating a second time resource pool and a third time resource pool according to one embodiment of the disclosure.

Embodiment 9 illustrates an example of a diagram of a second time resource pool and a third time resource pool, as shown in FIG. 9. In Embodiment 9, the second time resource pool includes M2 second time resource subpools, and the third time resource pool includes M3 third time resource subpools; any one of the M2 second time resource subpools includes a positive integer number of consecutive multicarrier symbols in time domain, and any one of the M3 third time resource subpools includes a positive integer number of consecutive multicarrier symbols in time domain.

In one subembodiment, for the base station in the disclosure, the M2 second time resource subpools are used for transmitting a given SSB of a given index.

In one subembodiment, for the base station in the disclosure, the M2 second time resource subpools are used for transmitting a PBCH of a given index.

In one subembodiment, for the base station in the disclosure, the M2 second time resource subpools are used for transmitting a System Information Block (SIB) of a given index.

In one subembodiment, the M2 second time resource subpools are configured as a Common Search Space (CSS).

In one subembodiment, radio signals in the M3 third time resource subpools are all transmitted employing the second antenna port group.

In one subembodiment, the M3 third time resource subpools are configured as a UE-Specific Search Space (USS).

In one subembodiment, the M3 third time resource subpools are discrete in time domain.

In one subembodiment, the M3 third time resource subpools are periodically distributed in time domain.

In one subembodiment, time domain positions occupied by the M3 third time resource subpools are configured through an RRC signaling.

In one subembodiment, there is(are) unoccupied multicarrier symbol(s) between any one second time resource subpool and any one third time resource subpool.

Embodiment 10

Figure 10:
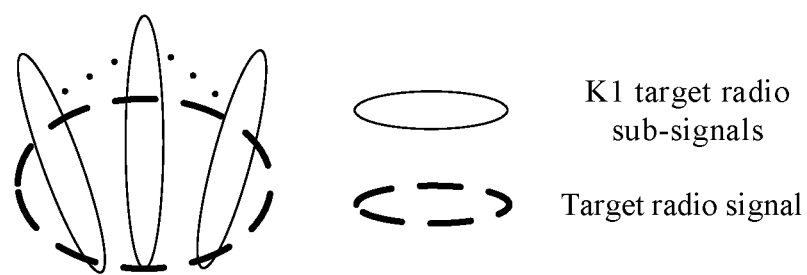
FIG. 10 is a diagram illustrating a target radio signal according to one embodiment of the disclosure.

Embodiment 10 illustrates an example of a diagram of a target radio signal, as shown in FIG. 10. In FIG. 10, the target radio signal includes K1 target radio sub-signals, the K1 target radio sub-signals are transmitted employing K1 target antenna port groups respectively, and the K1 is a positive integer.

In one subembodiment, the second antenna port group in the disclosure is an antenna port group other than the K1 target antenna port groups.

In one subembodiment, the K1 target radio sub-signals are all Physical Downlink Control Channels (PDCCHs), and the K1 target radio sub-signals are detected on K1 CORESETs respectively.

In one subembodiment, the phrase that a channel measurement for the target radio signal is used for triggering a transmitting of the first radio signal in the disclosure refers that: the K1 target radio sub-signals are all PDCCHs, Block Error Rate(s) for the K1 target radio sub-signals are all less than a first threshold within a given time window, and the first radio signal is transmitted.

In one affiliated embodiment of the above subembodiment, the phrase that all less than a first threshold within a given time window refers that: X1 detections are performed within the given time window, and results of the X1 detections are all less than a first threshold; the X1 is fixed, or the X1 is configured through an RRC signaling; and the X1 is a positive integer.

In one affiliated embodiment of the above subembodiment, the first threshold is fixed, or the first threshold is configured through an RRC signaling.

In one subembodiment, the phrase that a channel measurement for the target radio signal is used for triggering a transmitting of the first radio signal refers that: the K1 target radio sub-signals are all CSI-RSs, values of RSRP for the K1 target radio sub-signals are all less than a second threshold within a given time window, and the first radio signal is transmitted.

In one affiliated embodiment of the above subembodiment, the phrase that all less than a second threshold within a given time window refers that: X2 detections are performed within the given time window, and results of the X2 detections are all less than a second threshold; the X2 is fixed, or the X2 is configured through an RRC signaling; and the X2 is a positive integer.

In one affiliated embodiment of the above subembodiment, the second threshold is fixed, or the second threshold is configured through an RRC signaling.

In one subembodiment, the K1 target antenna port groups correspond to K1 CSI-RS resource configuration indexes respectively.

In one subembodiment, the K1 target antenna port groups correspond to K1 serving beams respectively.

In one subembodiment, for the K1 target antenna port groups, the base station performs only one time of LBT to judge whether the first frequency domain resource is idle on the K1 target antenna port groups.

In one subembodiment, the one time of LBT is used for a given antenna port group.

In one affiliated embodiment of the above subembodiment, the given antenna port group corresponds to a first-type spatial transmitting parameter group, and the K1 target antenna port groups correspond to K1 target spatial transmitting parameter groups.

In one example of the above affiliated embodiment, beams corresponding to the K1 target spatial transmitting parameter groups are all less than a beam corresponding to the first-type spatial transmitting parameter group in width.

In one example of the above affiliated embodiment, the first-type spatial transmitting parameter group is generated with less antennas compared with a given target spatial transmitting parameter group, and the given target spatial transmitting parameter group is any one of the K1 target spatial transmitting parameter groups.

In one affiliated embodiment of the above subembodiment, the first-type spatial transmitting parameter group corresponds to one transmitting beamforming vector.

In one affiliated embodiment of the above subembodiment, the K1 target spatial transmitting parameter groups correspond to K1 transmitting beamforming vectors respectively.

Embodiment 11

Figure 11:
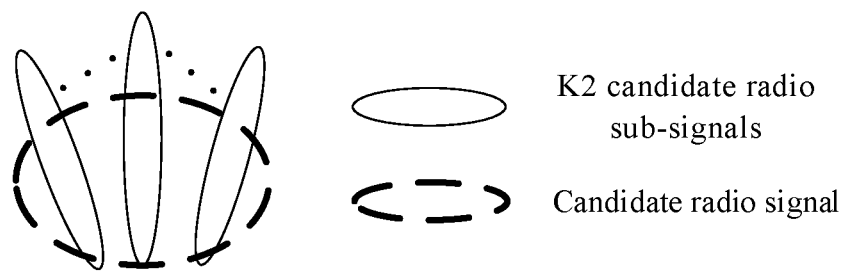
FIG. 11 is a diagram illustrating a candidate radio signal according to one embodiment of the disclosure.

Embodiment 11 illustrates an example of a diagram of a candidate radio signal, as shown in FIG. 11. In FIG. 11, the candidate radio signal includes K2 candidate radio sub-signals, the K2 candidate radio sub-signals are transmitted employing K2 candidate antenna port groups respectively, and the K2 is a positive integer.

In one subembodiment, the second antenna port group in the disclosure is one of the K2 candidate antenna port groups.

In one subembodiment, the third antenna port group in the disclosure is one of the K2 candidate antenna port groups.

In one affiliated embodiment of the above subembodiment, an RSRP of a candidate radio sub-signal transmitted on the second antenna port group is optimal in RSRPs of the K2 candidate radio sub-signals.

In one affiliated embodiment of the above subembodiment, a hypothetical PDCCH BLER corresponding to a candidate radio sub-signal transmitted on the second antenna port group is optimal in hypothetical PDCCH BLERs corresponding to the K2 candidate radio sub-signals.

In one affiliated embodiment of the above subembodiment, a hypothetical PDCCH BLER corresponding to a candidate radio sub-signal transmitted on the second antenna port group is greater than a third threshold, the third threshold if fixed, or the third threshold is configured through an RRC signaling.

In one affiliated embodiment of the above subembodiment, an RSRP of a candidate radio sub-signal transmitted on the third antenna port group is just less than an RSRP of a candidate radio sub-signal transmitted on the second antenna port group, in RSRPs of the K2 candidate radio sub-signals.

In one affiliated embodiment of the above subembodiment, a hypothetical PDCCH BLER corresponding to a candidate radio sub-signal transmitted on the third antenna port group is just less than a hypothetical PDCCH BLER corresponding to a candidate radio sub-signal transmitted on the second antenna port group, in hypothetical PDCCH BLERs corresponding to the K2 candidate radio sub-signals.

In one affiliated embodiment of the above subembodiment, a hypothetical PDCCH BLER corresponding to a candidate radio sub-signal transmitted on the third antenna port group is greater than a third threshold, the third threshold if fixed, or the third threshold is configured through an RRC signaling.

In one subembodiment, the second antenna port group is different from the third antenna port group.

In one subembodiment, a channel measurement for the candidate radio signal is used for triggering a transmitting of the first radio signal.

In one affiliated embodiment of the above subembodiment, the K2 candidate radio sub-signals are all CSI-RSs, there is a given candidate radio sub-signal in the K2 candidate radio sub-signals, the given candidate radio sub-signal is transmitted on the second antenna port group, values of RSRP of the given candidate radio sub-signal are all greater than a fourth threshold within a given time window, and the first radio signal is transmitted.

In one affiliated embodiment of the above subembodiment, the K2 candidate radio sub-signals are all PDCCHs, there is a given candidate radio sub-signal in the K2 candidate radio sub-signals, the given candidate radio sub-signal is transmitted on the second antenna port group, hypothetical PDCCH BLERs corresponding to the given candidate radio sub-signal are all greater than a third threshold within a given time window, and the first radio signal is transmitted.

In one subembodiment, the K2 candidate antenna port groups correspond to K2 CSI-RS resource configuration indexes respectively.

In one subembodiment, the K2 candidate antenna port groups correspond to K2 serving beams respectively.

In one subembodiment, for the K2 candidate antenna port groups, the base station performs only one time of LBT to judge whether the first frequency domain resource is idle on the K2 candidate antenna port groups.

In one subembodiment, the one time of LBT is used for a given antenna port group.

In one affiliated embodiment of the above subembodiment, the given antenna port group corresponds to a second-type spatial transmitting parameter group, and the K2 candidate antenna port groups correspond to K2 candidate spatial transmitting parameter groups.

In one example of the above affiliated embodiment, beams corresponding to the K2 candidate spatial transmitting parameter groups are all less than a beam corresponding to the second-type spatial transmitting parameter group in width.

In one example of the above affiliated embodiment, the second-type spatial transmitting parameter group is generated with less antennas compared with a given candidate spatial transmitting parameter group, and the given candidate spatial transmitting parameter group is any one of the K1 target spatial transmitting parameter groups.

In one affiliated embodiment of the above subembodiment, the second-type spatial transmitting parameter group corresponds to one transmitting beamforming vector.

In one affiliated embodiment of the above subembodiment, the K2 candidate spatial transmitting parameter groups correspond to K2 transmitting beamforming vectors respectively.

Embodiment 12

Figure 12:
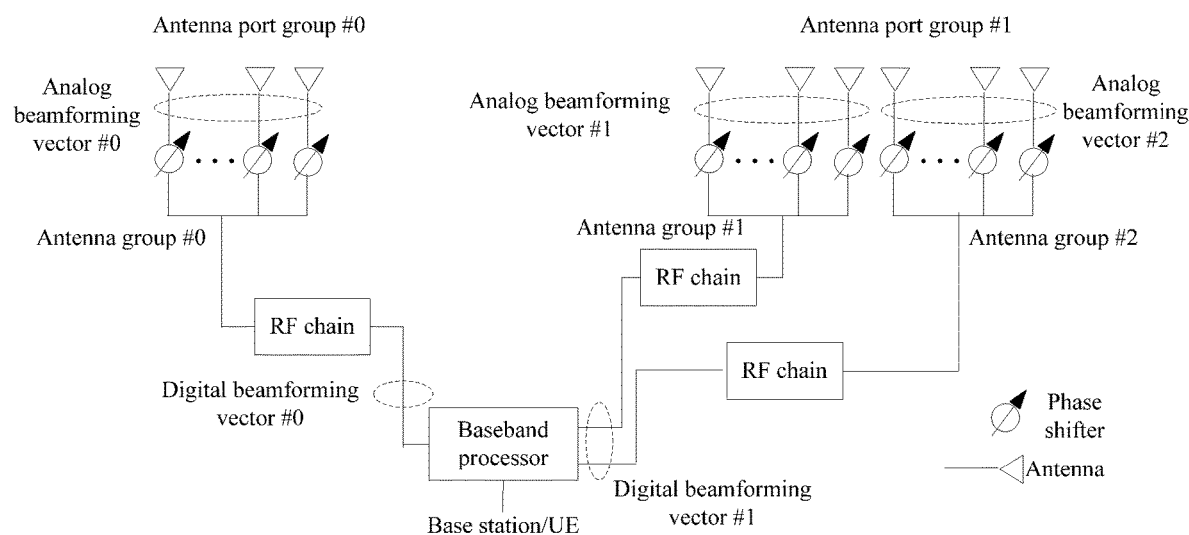
FIG. 12 is a diagram illustrating an antenna structure equipped on a UE according to one embodiment of the disclosure.

Embodiment 12 illustrates an example of a diagram of an antenna port and an antenna port group, as shown in FIG. 12.

In Embodiment 12, one antenna port group includes a positive integer number of antenna ports; one antenna port is formed by antennas in a positive integer number of antenna groups through antenna virtualization superposition; one antenna group includes a positive integer number of antennas. One antenna group is connected to a baseband processor through one Radio Frequency (RF) chain, and different antenna groups correspond to different RF chains. Mapping coefficients from all antennas in a positive integer number of antenna groups included in a given antenna port to the given antenna port constitute a beamforming vector corresponding to the given antenna port. Mapping coefficients from multiple antennas included in any one given antenna group among a positive integer number of antenna groups included in the given antenna port to the given antenna port constitute an analog beamforming vector of the given antenna group. Analog beamforming vectors corresponding to the positive integer number of antenna groups are diagonally arranged to form an analog beamforming matrix corresponding to the given antenna port. Mapping coefficients from the positive integer number of antenna groups to the given antenna port constitute a digital beamforming vector corresponding to the given antenna port. The beamforming vector corresponding to the given antenna port is obtained by a product of the analog beamforming matrix and the digital beamforming vector corresponding to the given antenna port. Different antenna ports in one antenna port group are formed by same antenna group(s), and different antenna ports in one same antenna port group correspond to different beamforming vectors.

FIG. 12 illustrates two antenna port groups, that is, an antenna port group #0 and an antenna port group #1, wherein the antenna port group #0 is formed by an antenna group #0, the antenna port group #1 is formed by an antenna group #1 and an antenna group #2. Mapping coefficients from multiple antennas in the antenna group #0 to the antenna port group #0 constitute an analog beamforming vector #0, a mapping coefficient from the antenna group #0 to the antenna port group #0 constitutes a digital beamforming vector #0. Mapping coefficients from multiple antennas in the antenna group #1 and multiple antennas in the antenna group #2 to the antenna port group #1 constitute an analog beamforming vector #1 and an analog beamforming vector #2 respectively. Mapping coefficients from the antenna group #1 and the antenna group #2 to the antenna port group #1 constitute a digital beamforming vector #1. A beamforming vector corresponding to any one antenna port in the antenna port group #0 is obtained by a product of the analog beamforming vector #0 and the digital beamforming vector #0. A beamforming vector corresponding to any one antenna port in the antenna port group #1 is obtained by a product of an analog beamforming matrix, which is formed by diagonal arrangement of the analog beamforming vector #1 and the analog beamforming vector #2, and the digital beamforming vector #1.

In one embodiment, one antenna port group includes one antenna port. For example, the antenna port group #0 illustrated in FIG. 12 includes one antenna port.

In one subembodiment, an analog beamforming matrix corresponding to the one antenna port is dimensionally reduced to an analog beamforming vector, a digital beamforming vector corresponding to the one antenna port is dimensionally reduced to one scalar, and a beamforming vector corresponding to the one antenna port is equal to the analog beamforming vector of the one antenna port. For example, the digital beamforming vector #0 in FIG. 12 is dimensionally reduced to one scalar, and the beamforming vector corresponding to the antenna port in the antenna port group #0 is the analog beamforming vector #0.

In one embodiment, one antenna port group includes multiple antenna ports. For example, the antenna port group #1 in FIG. 12 includes multiple antenna ports.

In one subembodiment, the multiple antenna ports correspond to a same analog beamforming matrix and different digital beamforming vectors.

In one embodiment, antenna ports in different antenna port groups correspond to different analog beamforming matrixes.

In one embodiment, any two antenna ports in one antenna port group are QCLed.

In one embodiment, any two antenna ports in one antenna port group are spatially QCLed.

Embodiment 13

Figure 13:
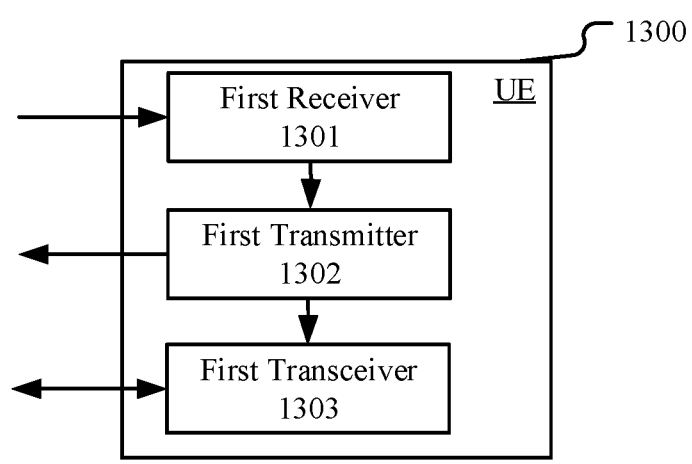
FIG. 13 is a structure block diagram illustrating a processing device in a UE according to one embodiment of the disclosure.

Embodiment 13 illustrates a structure block diagram of a processing device in a UE, as shown in FIG. 13. In FIG. 13, the processing device 1300 in the UE mainly includes a first receiver 1301, a first transmitter 1302 and a first transceiver 1303.

The receiver 1301 receives a target radio signal.

The first transmitter 1302 transmits a first radio signal in a first time resource pool.

The first transceiver 1303 monitors a first signaling in a second time resource pool in a first frequency domain resource.

In Embodiment 13, a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received.

In one subembodiment, the first transceiver 1303 further monitors a second signaling in a third time resource pool in the first frequency domain resource; the second signaling is transmitted employing the second antenna port group, and the second signaling is used for determining that the second antenna port group is acknowledged by a transmitter of the second signaling.

In one subembodiment, the first transceiver 1303 further receives a third radio signal in the third time resource pool in the first frequency domain resource; the first signaling determines that the first radio signal is correctly received and the UE detects the second signaling in the third time resource pool in the first frequency domain resource, and the third radio signal is transmitted employing the second antenna port group.

In one subembodiment, the first transceiver 1303 further transmits a fourth radio signal in the first time resource pool; the first signaling determines that the first radio signal is not correctly received, and the fourth radio signal is used for determining the second antenna port group.

In one subembodiment, the first transceiver 1303 further transmits a fifth radio signal in the first time resource pool; the first signaling determines that the first radio signal is correctly received and the UE does not detect the second signaling in the third time resource pool in the first frequency domain resource, the fifth radio signal is used for determining a third antenna port group, and the third antenna port group is different from the second antenna port group.

In one subembodiment, the first receiver 1301 further receives a candidate radio signal in the first frequency domain resource; a channel measurement for the candidate radio signal is used for determining the second antenna port group.

In one subembodiment, the first receiver 1301 further receives first information and second information respectively; the first information is used for determining at least one of multiantenna related transmitting of the target radio signal, frequency domain resources occupied by the target radio signal or time domain resources occupied by the target radio signal; the second information is used for determining at least one of multiantenna related transmitting of the candidate radio signal, frequency domain resources occupied by the candidate radio signal or time domain resources occupied by the candidate radio signal; the first information and the second information are transmitted through an air interface.

In one subembodiment, the first receiver 1301 includes at least the former two of the receiver 456, the receiving processor 452, the beam manager 441 or the controller/processor 490 illustrated in Embodiment 4.

In one subembodiment, the first transmitter 1302 includes at least the former two of the transmitter 456, the transmitting processor 455, the beam manager 441 or the controller/processor 490 illustrated in Embodiment 4.

In one subembodiment, the first transceiver 1303 includes at least the former three of the transmitter/receiver 456, the receiving processor 452, the transmitting processor 455, the beam manager 441 or the controller/process or 490 illustrated in Embodiment 4.

Embodiment 14

Figure 14:
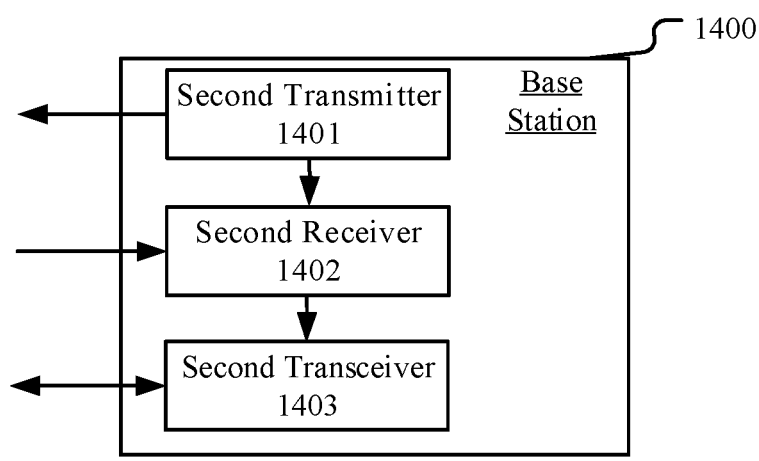
FIG. 14 is a structure block diagram illustrating a processing device in a base station according to one embodiment of the disclosure.

Embodiment 14 illustrates a structure block diagram of a processing device in a base station, as shown in FIG. 14. In FIG. 14, the processing device 1400 in the base station mainly includes a second transmitter 1401, a second receiver 1402 and a second transceiver 1403.

The second transmitter 1401 transmits a target radio signal.

The second receiver 1402 receives a first radio signal in a first time resource pool.

The second transceiver 1403 transmits a first signaling in a second time resource pool in a first frequency domain resource.

In Embodiment 14, a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received.

In one subembodiment, the second transceiver 1403 transmits a second signaling in a third time resource pool in the first frequency domain resource; the second signaling is transmitted employing the second antenna port group, and the second signaling is used for determining that the second antenna port group is acknowledged by the base station.

In one subembodiment, the second transceiver 1403 transmits a third radio signal in the third time resource pool in the first frequency domain resource; the first signaling determines that the first radio signal is correctly received and a transmitter of the first radio signal detects the second signaling in the third time resource pool in the first frequency domain resource, and the third radio signal is transmitted employing the second antenna port group.

In one subembodiment, the second transceiver 1403 receives a fourth radio signal in the first time resource pool; the first signaling determines that the first radio signal is not correctly received, and the fourth radio signal is used for determining the second antenna port group.

In one subembodiment, the second transceiver 1403 receives a fifth radio signal in the first time resource pool; the first signaling determines that the first radio signal is correctly received and a transmitter of the first radio signal does not detect the second signaling in the third time resource pool in the first frequency domain resource, the fifth radio signal is used for determining a third antenna port group, and the third antenna port group is different from the second antenna port group.

In one subembodiment, the second transmitter 1401 transmits a candidate radio signal in the first frequency domain resource; a channel measurement for the candidate radio signal is used for determining the second antenna port group.

In one subembodiment, the second transmitter 1401 transmits first information and second information respectively; the first information is used for determining at least one of multiantenna related transmitting of the target radio signal, frequency domain resources occupied by the target radio signal or time domain resources occupied by the target radio signal; the second information is used for determining at least one of multiantenna related transmitting of the candidate radio signal, frequency domain resources occupied by the candidate radio signal or time domain resources occupied by the candidate radio signal; the first information and the second information are transmitted through an air interface.

In one subembodiment, the second transmitter 1401 includes at least the former two of the transmitter 416, the transmitting processor 415, the beam manager 471 or the controller/processor illustrated in Embodiment 4.

In one subembodiment, the second receiver 1402 includes at least the former two of the receiver 416, the receiving processor 412, the beam manager 471 or the controller/processor 440 illustrated in Embodiment 4.

In one subembodiment, the second transceiver 1403 includes at least the former three of the transmitter/receiver 416, the receiving processor 412, the transmitting processor 415, the beam manager 471 or the controller/processor 440 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the disclosure includes but not limited to macro-cellular base stations, micro-cellular base stations, home base stations, relay base stations, gNBs (NR Nodes B), Transmitter Receiver Points (TRPs) and radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
   receiving a target radio signal;
   transmitting a first radio signal in a first time resource pool; and
   monitoring a first signaling in a second time resource pool in a first frequency domain resource;
   wherein a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received; the target radio signal includes K1 target radio sub-signals, the K1 target radio sub-signals are transmitted employing K1 target antenna port groups respectively, the second antenna port group is an antenna port group other than the K1 target antenna port groups; the first signaling includes a first field, the first field includes 1 bit, and the 1 bit is used for determining whether the first radio signal is correctly received; the first signaling is one Downlink Control Information, or, the first signaling is one uplink grant.

2. The method according to claim 1, wherein the first radio signal indicates Beam Recovery Request in New Radio, or, the first radio signal indicates PRACH; the first radio signal the K1 target antenna port groups correspond to K1 CSI-RS resource configuration indexes respectively.

3. The method according to claim 1, comprising:
   monitoring a second signaling in a third time resource pool in the first frequency domain resource;
   wherein the second signaling is transmitted employing the second antenna port group, and the second signaling is used for determining that the second antenna port group is acknowledged by a transmitter of the second signaling.

4. The method according to claim 3, comprising:
   receiving a third radio signal in the third time resource pool in the first frequency domain resource;
   wherein the first signaling determines that the first radio signal is correctly received and the UE detects the second signaling in the third time resource pool in the first frequency domain resource, and the third radio signal is transmitted employing the second antenna port group; the third radio signal is one DCI.

5. The method according to claim 1, comprising:
   transmitting a fourth radio signal in the first time resource pool;
   wherein the first signaling determines that the first radio signal is not correctly received, and the fourth radio signal is used for determining the second antenna port group;
   or, comprising:
   transmitting a fifth radio signal in the first time resource pool;
   wherein the first signaling determines that the first radio signal is correctly received and the UE does not detect the second signaling in the third time resource pool in the first frequency domain resource, the fifth radio signal is used for determining a third antenna port group, and the third antenna port group is different from the second antenna port group.

6. The method according to claim 1, comprising:
   receiving a candidate radio signal in the first frequency domain resource;
   wherein a channel measurement for the candidate radio signal is used for determining the second antenna port group;
   or, comprising:
   receiving first information and second information respectively;
   wherein the first information is used for determining at least one of multiantenna related transmitting of the target radio signal, frequency domain resources occupied by the target radio signal or time domain resources occupied by the target radio signal; the second information is used for determining at least one of multiantenna related transmitting of the candidate radio signal, frequency domain resources occupied by the candidate radio signal or time domain resources occupied by the candidate radio signal; the first information and the second information are transmitted through an air interface.

7. A method in a base station for wireless communication, comprising:
   transmitting a target radio signal;
   receiving a first radio signal in a first time resource pool; and
   transmitting a first signaling in a second time resource pool in a first frequency domain resource;
   wherein a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received; the target radio signal includes K1 target radio sub-signals, the K1 target radio sub-signals are transmitted employing K1 target antenna port groups respectively, the second antenna port group is an antenna port group other than the K1 target antenna port groups; the first signaling includes a first field, the first field includes 1 bit, and the 1 bit is used for determining whether the first radio signal is correctly received; the first signaling is one Downlink Control Information, or, the first signaling is one uplink grant.

8. The method according to claim 7, comprising:
   transmitting a second signaling in a third time resource pool in the first frequency domain resource;
   wherein the second signaling is transmitted employing the second antenna port group, and the second signaling is used for determining that the second antenna port group is acknowledged by the base station;
   transmitting a third radio signal in the third time resource pool in the first frequency domain resource;
   wherein the first signaling determines that the first radio signal is correctly received and a transmitter of the first radio signal detects the second signaling in the third time resource pool in the first frequency domain resource, and the third radio signal is transmitted employing the second antenna port group; the third radio signal is one DCI.

9. The method according to claim 7, comprising:
   receiving a fourth radio signal in the first time resource pool;
   wherein the first signaling determines that the first radio signal is not correctly received, and the fourth radio signal is used for determining the second antenna port group;
   or, comprising:
   wherein the first radio signal indicates Beam Recovery Request; the first radio signal the K1 target antenna port groups correspond to K1 CSI-RS resource configuration indexes respectively, or, the first radio signal indicates PRACH.

10. The method according to claim 7, comprising:
   transmitting a candidate radio signal in the first frequency domain resource;
   wherein a channel measurement for the candidate radio signal is used for determining the second antenna port group;
   or, comprising:
   transmitting first information and second information respectively;
   wherein the first information is used for determining at least one of multiantenna related transmitting of the target radio signal, frequency domain resources occupied by the target radio signal or time domain resources occupied by the target radio signal; the second information is used for determining at least one of multiantenna related transmitting of the candidate radio signal, frequency domain resources occupied by the candidate radio signal or time domain resources occupied by the candidate radio signal; the first information and the second information are transmitted through an air interface.

11. A UE for wireless communication, comprising:
   a first receiver, to receive a target radio signal;
   a first transmitter, to transmit a first radio signal in a first time resource pool; and
   a first transceiver, to monitor a first signaling in a second time resource pool in a first frequency domain resource;
   wherein a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received; the target radio signal includes K1 target radio sub-signals, the K1 target radio sub-signals are transmitted employing K1 target antenna port groups respectively, the second antenna port group is an antenna port group other than the K1 target antenna port groups; the first signaling includes a first field, the first field includes 1 bit, and the 1 bit is used for determining whether the first radio signal is correctly received; the first signaling is one Downlink Control Information, or, the first signaling is one uplink grant.

12. The UE according to claim 11, wherein the first radio signal indicates Beam Recovery Request in New Radio, or, the first radio signal indicates PRACH; the first radio signal the K1 target antenna port groups correspond to K1 CSI-RS resource configuration indexes respectively.

13. The UE according to claim 11, wherein the first transceiver monitors a second signaling in a third time resource pool in the first frequency domain resource; the second signaling is transmitted employing the second antenna port group, and the second signaling is used for determining that the second antenna port group is acknowledged by a transmitter of the second signaling.

14. The UE according to claim 13, wherein the first transceiver receives a third radio signal in the third time resource pool in the first frequency domain resource; the first signaling determines that the first radio signal is correctly received and the UE detects the second signaling in the third time resource pool in the first frequency domain resource, and the third radio signal is transmitted employing the second antenna port group; the third radio signal is one DCI.

15. The UE according to claim 11, wherein the first transceiver transmits a fourth radio signal in the first time resource pool; the first signaling determines that the first radio signal is not correctly received, and the fourth radio signal is used for determining the second antenna port group;
   or, wherein the first transceiver transmits a fifth radio signal in the first time resource pool; the first signaling determines that the first radio signal is correctly received and the UE does not detect the second signaling in the third time resource pool in the first frequency domain resource, the fifth radio signal is used for determining a third antenna port group, and the third antenna port group is different from the second antenna port group.

16. The UE according to claim 11, wherein the first receiver receives a candidate radio signal in the first frequency domain resource; a channel measurement for the candidate radio signal is used for determining the second antenna port group;
   or, wherein the first receiver receives first information and second information respectively; the first information is used for determining at least one of multiantenna related transmitting of the target radio signal, frequency domain resources occupied by the target radio signal or time domain resources occupied by the target radio signal; the second information is used for determining at least one of multiantenna related transmitting of the candidate radio signal, frequency domain resources occupied by the candidate radio signal or time domain resources occupied by the candidate radio signal; the first information and the second information are transmitted through an air interface.

17. A base station for wireless communication, comprising:
   a second transmitter, to transmit a target radio signal;
   a second receiver, to receive a first radio signal in a first time resource pool; and
   a second transceiver, to transmit a first signaling in a second time resource pool in a first frequency domain resource;
   wherein a channel measurement for the target radio signal is used for triggering a transmitting of the first radio signal; the first signaling is transmitted employing a first antenna port group, the first radio signal is used for determining a second antenna port group, and the first antenna port group is different from the second antenna port group; the first signaling is a physical layer signaling, and the first signaling is used for determining whether the first radio signal is correctly received; the target radio signal includes K1 target radio sub-signals, the K1 target radio sub-signals are transmitted employing K1 target antenna port groups respectively, the second antenna port group is an antenna port group other than the K1 target antenna port groups; the first signaling includes a first field, the first field includes 1 bit, and the 1 bit is used for determining whether the first radio signal is correctly received; the first signaling is one Downlink Control Information, or, the first signaling is one uplink grant.

18. The base station according to claim 17, wherein the second transceiver transmits a second signaling in a third time resource pool in the first frequency domain resource; the second signaling is transmitted employing the second antenna port group, and the second signaling is used for determining that the second antenna port group is acknowledged by the base station; wherein the second transceiver transmits a third radio signal in the third time resource pool in the first frequency domain resource; the first signaling determines that the first radio signal is correctly received and a transmitter of the first radio signal detects the second signaling in the third time resource pool in the first frequency domain resource, and the third radio signal is transmitted employing the second antenna port group; the third radio signal is one DCI.

19. The base station according to claim 17, wherein the second transceiver receives a fourth radio signal in the first time resource pool; the first signaling determines that the first radio signal is not correctly received, and the fourth radio signal is used for determining the second antenna port group;
   or, wherein the second transceiver receives a fifth radio signal in the first time resource pool; the first signaling determines that the first radio signal is correctly received and a transmitter of the first radio signal does not detect the second signaling in the third time resource pool in the first frequency domain resource, the fifth radio signal is used for determining a third antenna port group, and the third antenna port group is different from the second antenna port group.

20. The base station according to claim 17, wherein the second transmitter transmits a candidate radio signal in the first frequency domain resource; a channel measurement for the candidate radio signal is used for determining the second antenna port group;
   or, wherein the second transmitter transmits first information and second information respectively; the first information is used for determining at least one of multiantenna related transmitting of the target radio signal, frequency domain resources occupied by the target radio signal or time domain resources occupied by the target radio signal; the second information is used for determining at least one of multiantenna related transmitting of the candidate radio signal, frequency domain resources occupied by the candidate radio signal or time domain resources occupied by the candidate radio signal; the first information and the second information are transmitted through an air interface.

* * * * *